July 15, 1924.
J. B. STRAUSS
1,501,145
OBSERVATION APPARATUS
Filed April 3, 1916    5 Sheets-Sheet 1
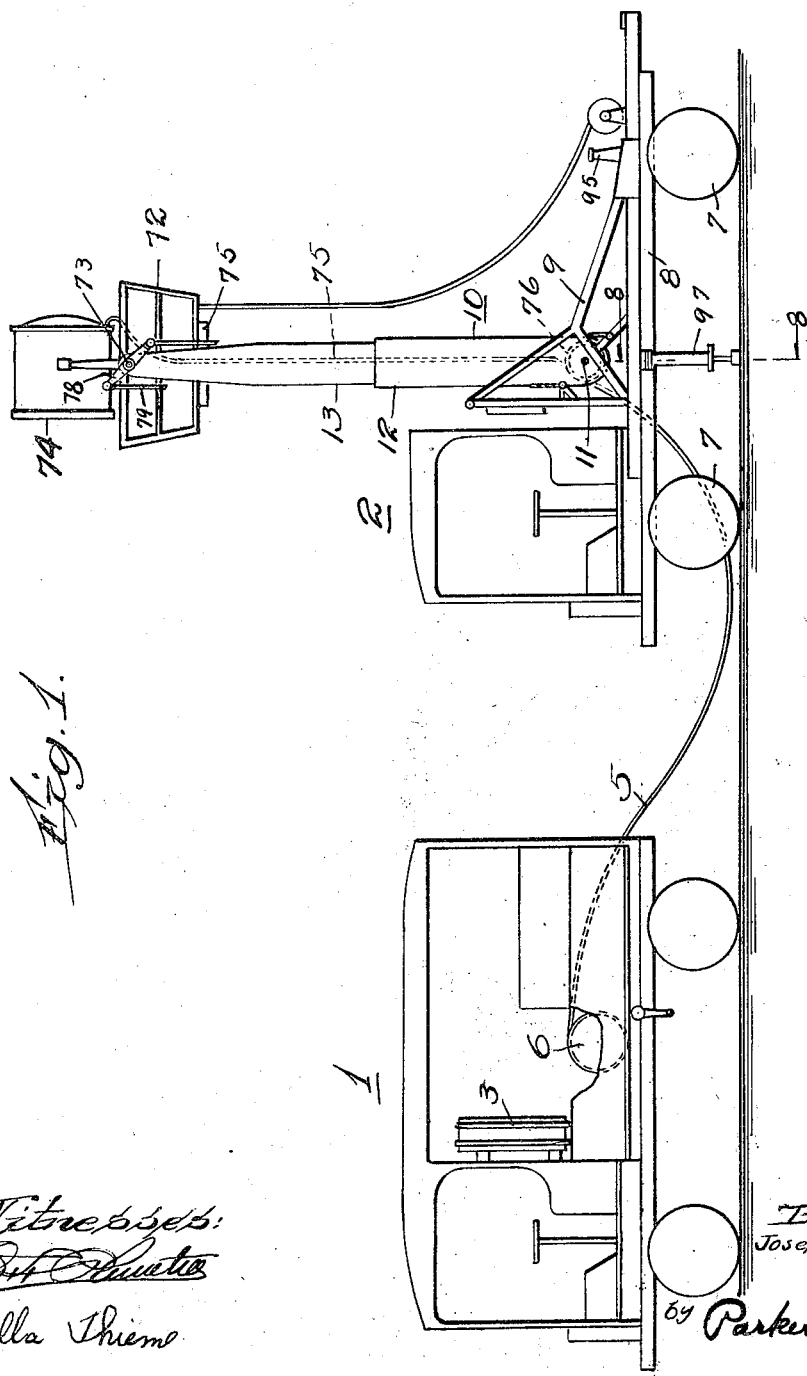

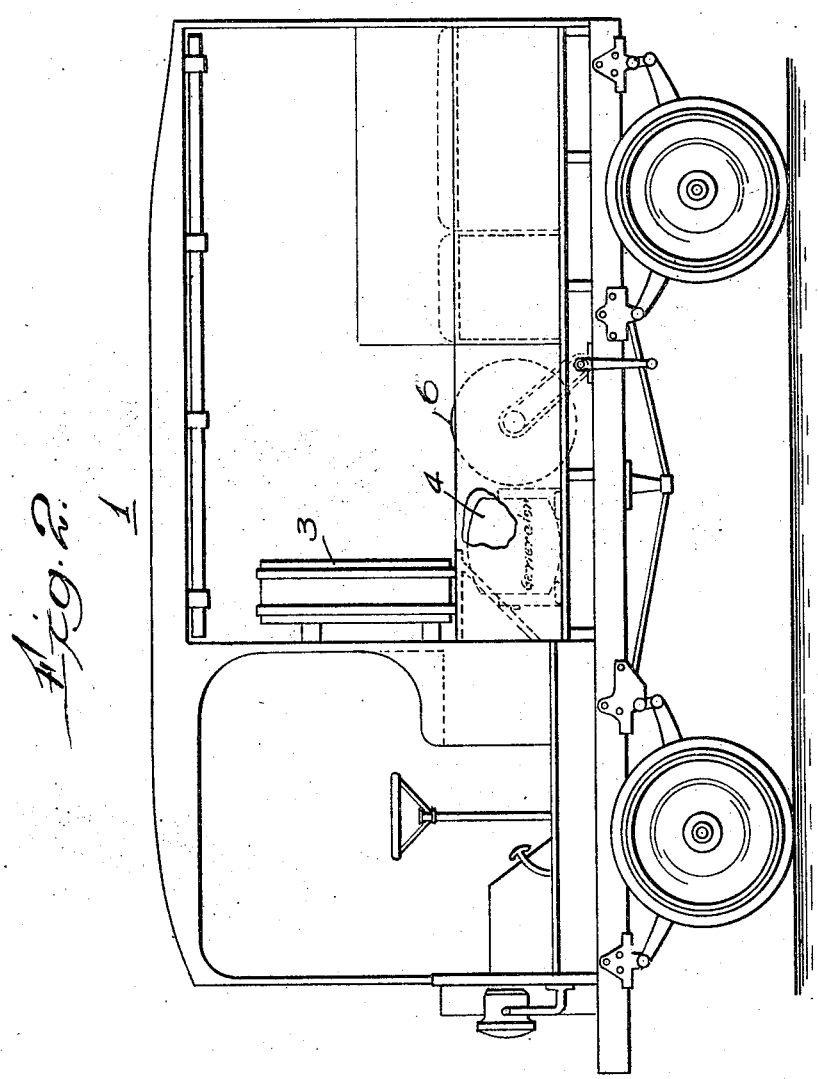

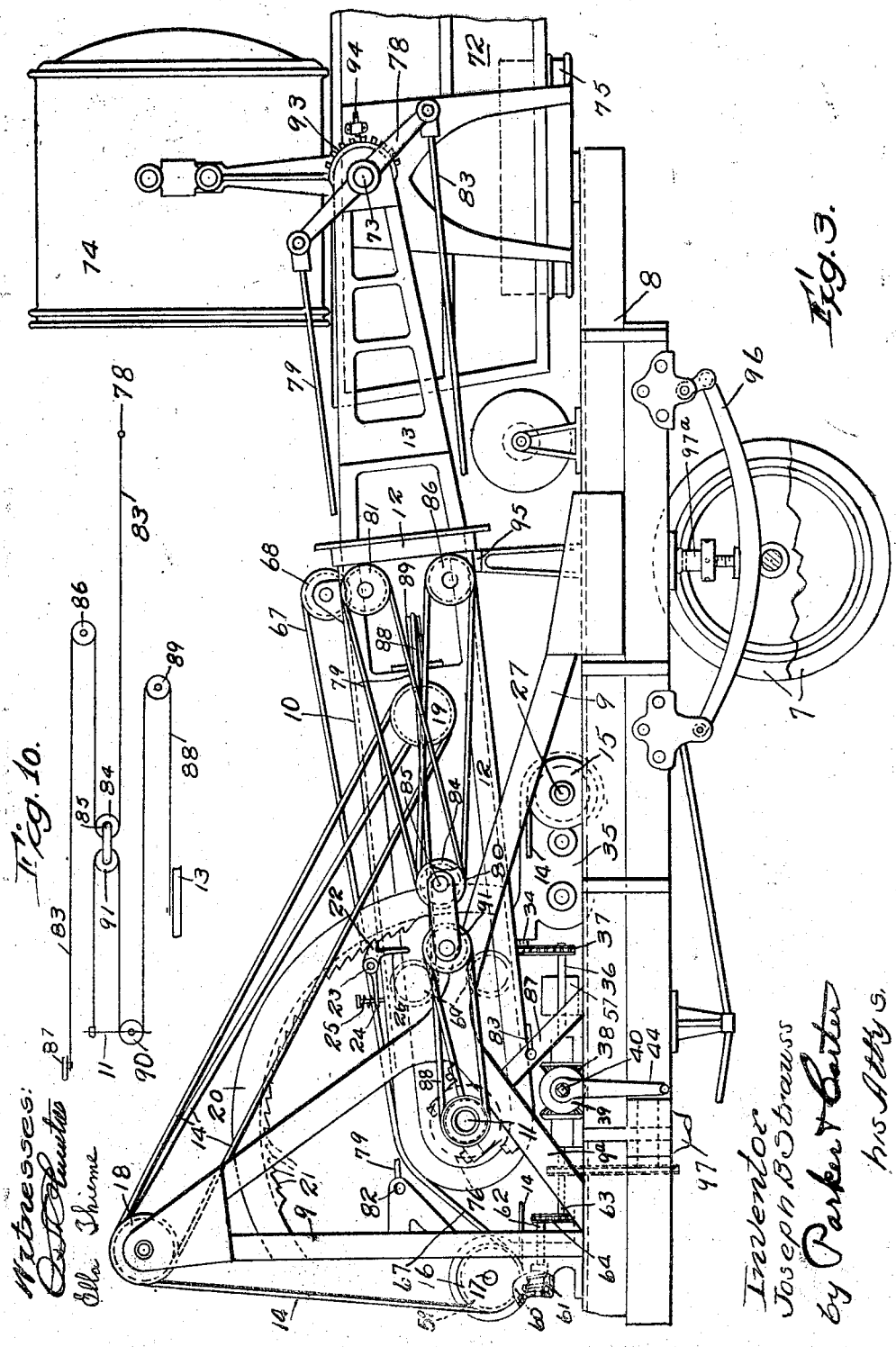

July 15, 1924.  
J. B. STRAUSS  
OBSERVATION APPARATUS  
Filed April 3, 1916
1,501,145
5 Sheets-Sheet 4
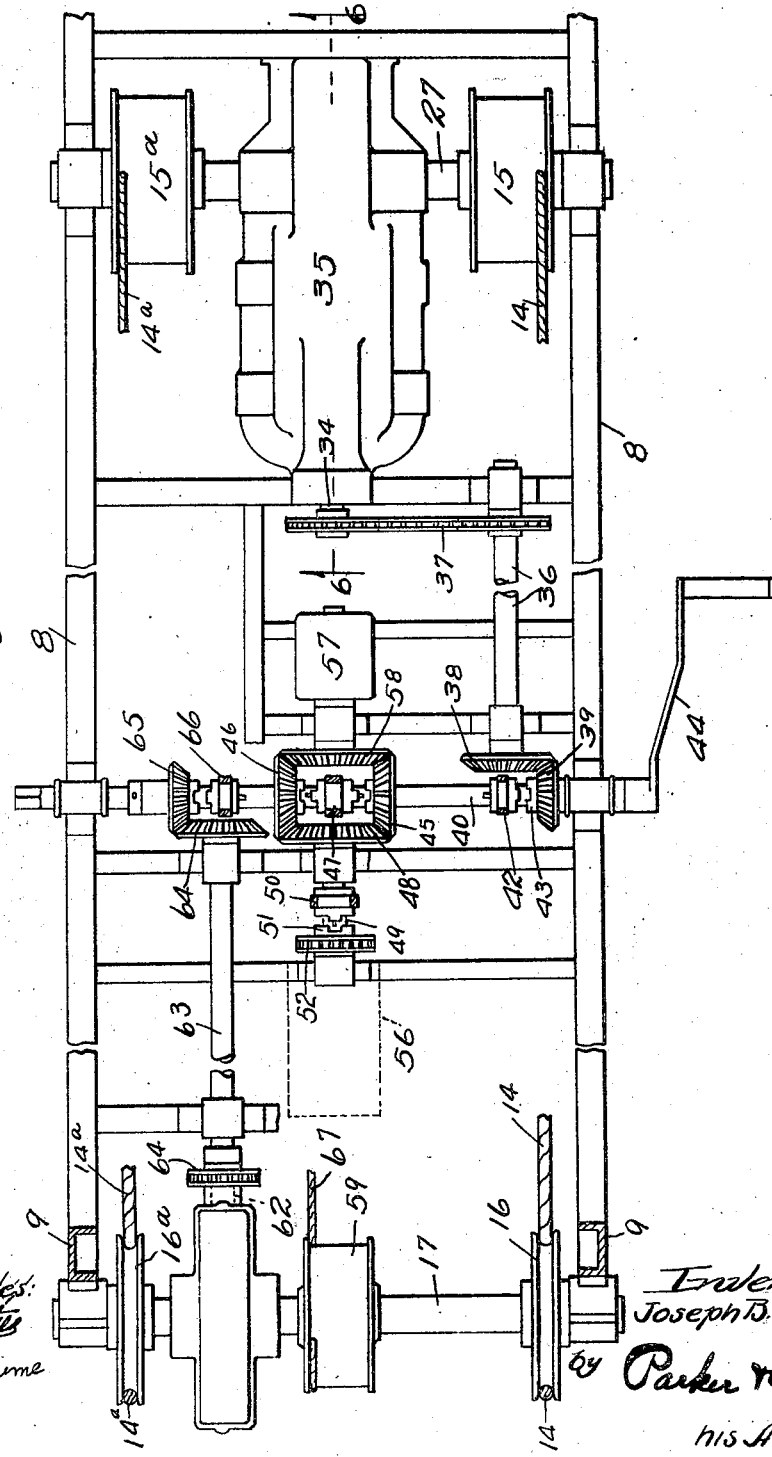

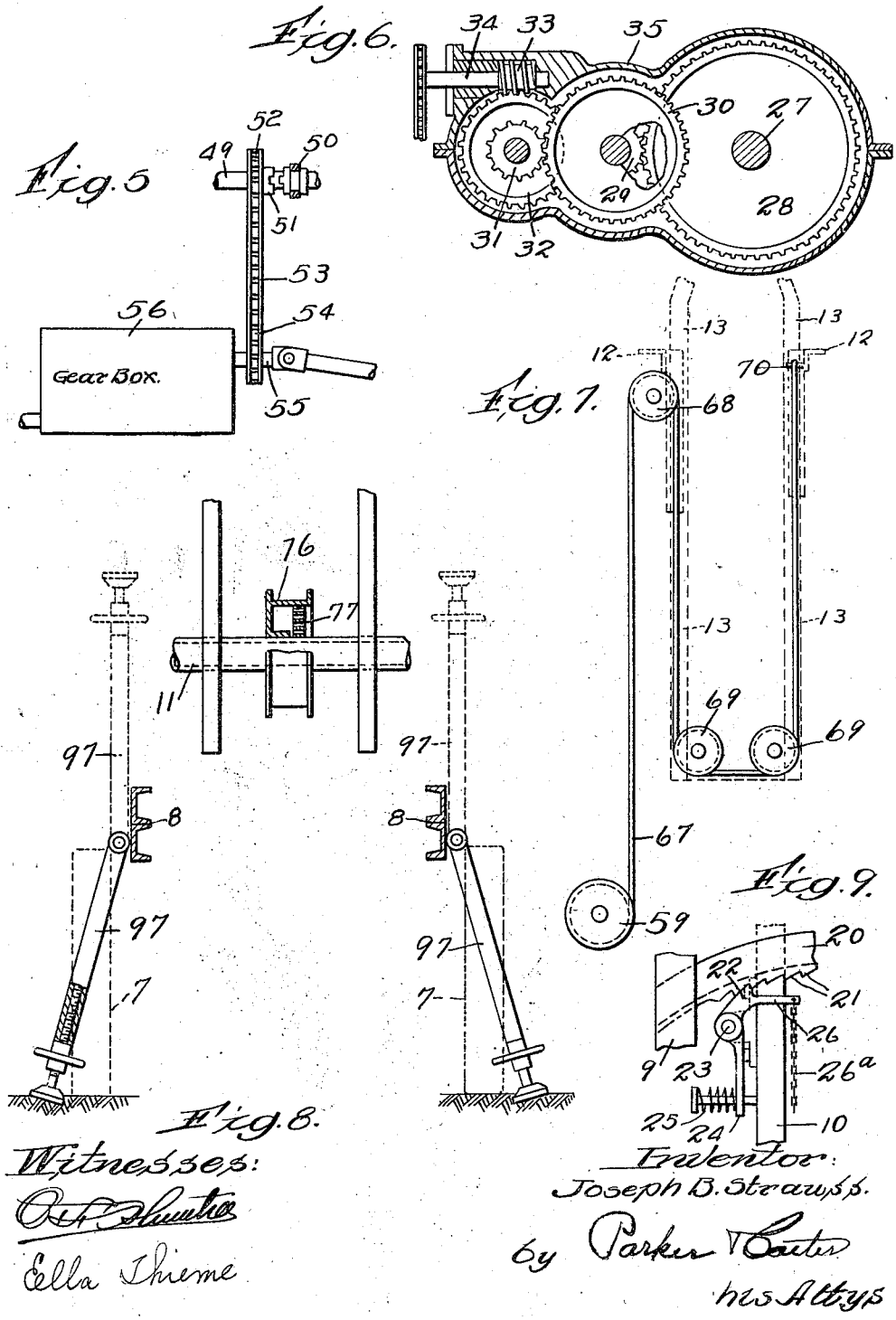

Patented July 15, 1924.

1,501,145

UNITED STATES PATENT OFFICE.

JOSEPH B. STRAUSS, OF CHICAGO, ILLINOIS.

OBSERVATION APPARATUS.

Application filed April 3, 1916. Serial No. 88,596.

*To all whom it may concern:*

Be it known that I, JOSEPH B. STRAUSS, a citizen of the United States, residing at Chicago, in the county of Cook and State of Illinois, have invented a certain new and useful Improvement in Observation Apparatus, of which the following is a specification.

This invention relates to military observation apparatus and has for its object to provide a new and improved apparatus of this description particularly adapted to be moved from place to place and easily and quickly and safely manipulated. The invention is illustrated in the accompanying drawings, wherein—

Figure 1 is a view showing one form of device embodying the invention, the parts being shown more or less diagrammatically;

Figure 2 is an enlarged view of the forward unit illustrated in Fig. 1;

Figure 3 is a view of the portion of the rear unit carrying the movable arm and illustrated in Fig. 1;

Figure 4 is a plan view of the operating mechanism for the movable arm, the movable arm and the parts above the operating mechanism being removed to show its construction;

Figure 5 is a view showing the connection from the transmission or gear box of the second unit to the driving shaft of the tower operating mechanism;

Figure 6 is a sectional view taken on line 6—6 of Fig. 4;

Figure 7 is a diagrammatic view of the cable used to extend the upper section of the movable arm;

Figure 8 is an enlarged sectional view taken on line 8—8 of Fig. 1, with parts omitted;

Figure 9 is a detail of the latch of the safety mechanism for the movable arm.

Figure 10 is a diagrammatic view showing the cables used with the mechanism for keeping the basket in a horizontal position.

Like numerals refer to like parts throughout the several figures.

In carrying out my invention I prefer to provide two portable units, a forward or first unit 1 and a rear or second unit 2. Both of these units may be self-propelling devices such as motor trucks, or the first unit may be self-propelling, the second unit being pulled along by the first unit. When two units are used, the first unit 1 carries the crew and extra parts such as the extra mirror 3 for the searchlight on the second unit. This unit also carries an electric generator 4 operated from the engine of the truck and which generates current for the electrical apparatus on the second unit. A cable 5 carrying suitable conductors passes around a reel 6 and is electrically connected with the generator, the reel being arranged so that this cable can be reeled or unreeled in order to permit the first unit to be moved to a safe distance from the second unit when the second unit is in operation in proximity to the enemy. This cable is preferably of sufficient length to permit the first unit to be moved several hundred feet from the second unit and still supplies current to the apparatus on the second unit. The second unit is provided with suitable wheels 7 and a frame or chassis 8 carried thereby. Mounted upon the frame 8 is a support 9. This support is preferably a trussed frame or truss support made up of truss members. A movable arm 10 is mounted upon the support 9. In the construction shown, this movable arm rotates about a pivotal point formed by the trunnions 11, and is preferably extensible, being made up of two sections 12 and 13. The movable arm is moved about its pivotal point by some suitable mechanism. In the construction herein shown the arm is moved to its upright position by means of a flexible power transmitting device, such as a cable, actuated by any suitable means. In the construction shown there are two cables 14 and 14$^a$ (see Fig. 4), one at each side, and these cables are connected to the drums 15 and 15$^a$. These cables engage the pulleys 16 and 16$^a$ loosely mounted on the shaft 17. Since the cable and its associated parts on one side is an exact duplicate of the cable and its associated parts on the other side, I will simply describe the cable at one side. The cable 14 (see Fig. 3) passes about a pulley 18 mounted at the upper end of the truss frame or support 9. This cable then passes around a pulley 19 connected with the movable arm 10. The cable again passes around the pulley 18, which is a double grooved pulley, and then connects with a fixed part of the movable arm, as for example, the shaft of the pulley 19. It will thus be seen that when the drums 15 and 15$^a$ are rotated the movable arm will be lifted to an upright position, as shown in Fig. 1. I prefer to provide a safety device for preventing the arm from falling in the event the cables are broken or shot away. This safety device as herein shown, consists of one or more racks 20 connected with the truss support 9 and provided with teeth 21. A pawl 22 is connected with the movable arm and is arranged so that it moves freely along the teeth 21 as the arm is lifted, but prevents the lowering of the arm. It will thus be seen that if there is any accident to the operating mechanism, the arm would be held by the pawl or pawls.

When it is desired to lower the arm the pawl is moved out of engagement with the teeth 21. This pawl and toothed rack construction forms a suitable latch or safety device for the movable arm. In the construction shown (see Fig. 9), the pawl is pivoted at 23 and is provided with a projecting end 24 normally pressed by a spring 25 to hold the pawl in engagement with the teeth. There is a releasing arm 26 by means of which the pawl can be released. A flexible device 26ª may be connected with this releasing arm so that it may be controlled from the ground. The drums may be rotated in any manner. I have illustrated a construction where these drums may be rotated either from the differential of the truck or by hand or by a separate motor. These three arrangements are shown in Fig. 4. In this figure the drums 15 and 15ª are connected with the shaft 27. A gear 28 on this shaft meshes with the pinion 29, which is connected with a gear 30, which in turn meshes with a pinion 31, said latter pinion being connected with a worm gear 32. The worm gear 32 engages the worm 33 on a shaft 34, said worm gear and gears and pinions being enclosed within the casing 35. The shaft 34 is operatively connected with the shaft 36 as by means of the chain 37 and sprocket wheels on the two shafts. The shaft 36 is provided with a bevel gear 38 engaging a bevel gear 39 loosely mounted on a shaft 40. Upon this shaft is a clutch member 42 adapted when brought into contact with clutch member 43 on the beveled gear 39 to connect said gear to the shaft. The shaft 40 is provided with a removable handle 44 so that it may be rotated by hand if necessary. Loosely mounted upon the shaft 40 are the two bevel gears 45 and 46, each having clutch members connected therewith. A sliding clutch member 47 is feathered to the shaft so that either gear can be connected with the shaft. Meshing with the gears 45 and 46 is a bevel gear 48 on a shaft 49 containing a sliding clutch member 50 which engages a clutch member 51 connected with a sprocket wheel 52 loosely mounted on the shaft 49. The sprocket wheel 52 is connected by a chain 53 (see Fig. 5) with a sprocket wheel 54 on the shaft 55 which projects from the differential gear box 56. It will be seen, therefore, that by moving the clutch members 47 into engagement with one of the gears 45 and 46 the shaft 40 may be rotated in one direction and by moving it into engagement with the other bevel gear said shaft may be rotated in the other direction. And it will further be seen that when the clutches 50, 47 and 42 are in engagement with their associated clutch members, the entire train of mechanism is driven from the truck motor so as to elevate the arm 10. If desired, said arm 10 may be lifted by means of an electric motor 57 connected with a beveled gear 58 which meshes with the bevel gears 45 and 46. This motor may be supplied with current from any suitable source, as for example, the generator on the first unit. The member 13 of the movable arm may be extended by any suitable mechanism. As herein shown, the shaft 17 is provided with a drum 59 connected so as to rotate therewith (see Fig. 4). This shaft is rotated by means of a worm gear 60, which engages a worm 61 (see Fig. 3) on a shaft 62 operatively connected with the shaft 40. As herein shown, the shaft 62 is connected to a shaft 63 by means of a chain 64 and suitable sprocket wheels. The shaft 63 is provided with a bevel gear 64, which engages a bevel gear 65 loosely mounted on a shaft 40. A sliding clutch 66 on the shaft 40 engages the clutch member on the gear 65 to connect the gear with the shaft 40. It will be seen that when these two clutch members are in engagement the shaft 63 and hence the shafts 17 and drum 59 will be driven. Connected with the drum 59 is a flexible power transmitting device, such as a cable 67 (see Figs. 3 and 7). The cable 67 passes over a pulley 68 attached to the upper end 12 of the lower section of the arm 10. The cable then passes downwardly and engages a pulley 69 connected with the lower end of the upper section 13 of the arm. This cable then passes across to another pulley 69, also connected with the lower end of the upper section 13 and then passes upwardly and is fastened at 70 to the lower section 12 of the arm. By placing this cable in a vertical plane passing through the center of the arm, the device may be manipulated with a single cable. It will thus be seen that when the drum 59 is rotated in one direction the upper section 13 will be extended, and when rotated in the opposite direction the upper section will descend and the two sections will be telescoped.

I prefer to use two truss frames 9, one at each side. These truss frames are each provided with an inclined member 9ª, upon which the trunnions 11 of the movable arm are supported. The arm 10 is provided at its upper end with a suitable carrying device, such as the basket 72. This basket is pivotally connected by means of pivots 73 with the upper end of the arm. A searchlight 74 is carried by this basket and is rotatably mounted therein. The lower end 75 of the searchlight projects through the bottom of the basket. This gives better control of the lamp and lowers the center of gravity. There is a clear way in said basket around the searchlight, so that the man in the basket can pass entirely around the searchlight and have sufficient space in which to operate it. The searchlight is furnished current by a suitable conductor or feed cable 75, which passes up through the arm and which is wound around a drum 76 on the rotating mounting of the arm, that is, this drum is mounted about the axis about which the arm rotates. This drum is a spring actuated drum being provided with a coil spring 77 (see Fig. 8) so that when the upper end of the arm is extended the cable will unwind automatically, and when the upper end of the arm is lowered it will be wound up automatically. This cable is connected with the cable 5, which leads to the source of current supply. The basket 72 is provided with means for holding it in a horizontal position in all its various positions, and this means is automatically adjustable to compensate for the raising and lowering of the upper end of the arm. As herein shown, there is connected with the pivot or trunnion 73 of the basket an arm 78; connected with one end of this arm is a flexible device 79 which passes downwardly and engages a pulley 80 freely swung so that it may move with relation to the arm. The flexible device or cable then passes up over the pulley 81 connected with the lower section 12 of the arm. The cable then passes downwardly and connects with the fixed part 82 on the support. To the other end of the arm 78 is connected a flexible device or cable 83, which passes down over a pulley 84 on the same shaft 85 as the pulley 80, and then passes up over the pulley 86 connected with the upper part of the lower section 12 of the arm. The cable then passes down and is fastened to a fixed part 87 connected with the frame 9. This arrangement is shown diagrammatically in Fig. 10. The cables 83 and 79 are arranged in exactly the same manner and I have simply shown diagrammatically the cable 83. The cable 88 passes over a pulley 89 and has its end connected to the lower end of the section 13 (see Fig. 10). The other portion of the cable passes down over a pulley 90 concentric with the axis or trunnions 11. This cable then passes up over a pulley 91 mounted in the same frame as the pulleys 80 and 84. The cable then passes down and is fastened to the lower section 12 of the arm, preferably at the axis of the pulley 90. The other side of the arm may have a similar mechanism for holding the basket horizontally although only one such device may be used if desired. It will be seen that by means of this construction when the upper end of the arm is extended, the several sections of the cables are kept taut and in proper relation by the movement of the block containing the pulleys 80, 84 and 91. In order to hold the basket in a proper upright position in the event the cables 79 and 83 are injured or shot away, I provide a rack 93 attached to the upper end of the section 13 and I provide a pawl or holding part 94 connected with the basket and adapted to engage these teeth. The pawl 94 is out of engagement with the teeth when the arm is being raised and lowered but when the arm reaches its up position this pawl is moved to engage the teeth so as to hold the basket in its upright position in the event the cables are cut or injured. When it is desired to lower the arm this pawl is moved out of engagement with the teeth. This pawl may be controlled from the ground by means of a suitable cord or the like. The pawl and teeth form a ratchet construction for locking the basket and the arm together. When the arm is down and ready to be transported it rests upon a spring device 95 which relieves the jarring as the device is moved along the road. In the ordinary construction used there are springs 96 interposed between the wheels and the frame of the device.

When a searchlight is used and it is focused on a distant object it will be seen that a small movement of the searchlight will prevent it from being focused on the object because the cross sectional area of the light is comparatively small and a small movement of the source of light produces a large movement of the light at a distance, and in order to remove the searchlight from the influence of the springs and the vibrations due thereto, and from any vibration due to the wheels, I prefer when the searchlight is in operation, to directly connect the frame supporting the searchlight with the ground, thus insuring against these vibrations. I do this by providing removable supports 97, which when the second unit is brought to a standstill may be placed in position as shown in Figs. 1 and 8. These removable supports are adjustable so that they may be adjusted when in position, thereby directly connecting the frame carrying the support of the movable arm, with the ground. Any number of these supports may be used. It will be seen that these supports are important factors in connection with the searchlight, because the movement of the party in the basket will move the searchlight if they are not used, and if the engine is left running these vibrations will also cause movement of the searchlight. I have shown the supports as pivotally connected to the frame so that they may be lifted up out of position as shown in Fig. 8, and then easily and quickly moved down into position when the device is standing still and then adjusted to take the weight.

I may use adjustable jacks 97ª between the frame 8 and the axles of the wheels to prevent vibrations due to the springs as shown in Figure 3. The jacks also carry the load directly from the frame to the axles when the device is being used so as to take the load from the springs.

I claim:

1. A portable observation apparatus comprising a motor truck, a transmission mechanism therefore, a rotating and extensible arm mounted on said motor truck, mechanism for acting upon said arm to extend it, and mechanism for lifting said arm, and operative connections between both of said sets of mechanism for said arm and the transmission mechanism of the truck.

2. A portable observation apparatus comprising an arm adapted to be lifted and lowered, a truss supporting frame on which said arm is mounted, said truss supporting frame provided with a front post, a pulley on said front post, a flexible cable engaging said pulley, said flexible cable connected with said arm, and operating mechanism for operating said cable so as to lift and lower said arm.

3. An observation apparatus comprising a frame, an extensible arm pivotally connected to said frame, a carrying device connected with said extensible arm, and positively acting means connected with said carrying device and with a device at a distance therefrom for keeping the carrying device level as the arm is moved to various positions.

4. In a portable observation apparatus, the combination of a first unit comprising a vehicle for the operating crew, a generator on said vehicle, a second unit comprising a vehicle, an elevated arm connected with said latter vehicle, a translating device connected with said elevated arm, electrically operated mechanism for raising and lowering the arm, and an electrical connection from said generator to said latter mechanism.

In testimony whereof, I affix signature in the presence of two witnesses this 1st day of April, 1916.

JOSEPH B. STRAUSS.

Witnesses:
ELLA THIEME,
OLSEN L. RUETHER.